(12) United States Patent
Krishnaswamy et al.

(10) Patent No.: US 7,589,162 B2
(45) Date of Patent: Sep. 15, 2009

(54) POLYETHYLENE COMPOSITIONS AND PIPE MADE FROM SAME

(75) Inventors: Rajendra K. Krishnaswamy, Bartlesville, OK (US); Qing Yang, Bartlesville, OK (US); David C. Rohlfing, Bartlesville, OK (US); Max P. McDaniel, Bartlesville, OK (US); Kumudini C. Jayaratne, Bartlesville, OK (US); Jim E. French, Bartlesville, OK (US)

(73) Assignee: Chevron Philips Chemical Company LP, The Woodlands, TX (US)

( * ) Notice: Subject to any disclaimer, the term of this patent is extended or adjusted under 35 U.S.C. 154(b) by 151 days.

(21) Appl. No.: 11/358,959

(22) Filed: Feb. 22, 2006

(65) Prior Publication Data

US 2007/0197716 A1    Aug. 23, 2007

(51) Int. Cl.
*C08F 10/02* (2006.01)
*C08F 210/16* (2006.01)
*C08L 23/06* (2006.01)
*F16L 9/12* (2006.01)

(52) U.S. Cl. .................. 526/348.2; 526/348; 526/348.3; 526/348.4; 526/348.5; 526/113; 526/114; 526/118; 526/119; 428/36.8

(58) Field of Classification Search .................. 526/348, 526/348.2, 348.3, 348.5, 113, 114, 118, 119; 428/36.8
See application file for complete search history.

(56) References Cited

U.S. PATENT DOCUMENTS

| | | |
|---|---|---|
| 3,248,179 A | 4/1966 | Norwood |
| 4,153,667 A | 5/1979 | Brady et al. |
| 4,501,885 A | 2/1985 | Sherk et al. |
| 4,588,790 A | 5/1986 | Jenkins, III et al. |
| 5,352,749 A | 10/1994 | DeChellis et al. |
| 5,365,792 A | 11/1994 | Carroll, Jr. |
| 5,436,304 A | 7/1995 | Griffin et al. |
| 5,438,878 A | 8/1995 | Carroll, Jr. |
| 5,455,314 A | 10/1995 | Burns et al. |
| 5,565,175 A | 10/1996 | Hottovy et al. |
| 5,575,979 A | 11/1996 | Hanson |
| 6,239,235 B1 | 5/2001 | Hottovy et al. |
| 6,262,191 B1 | 7/2001 | Hottovy et al. |
| 6,344,515 B1* | 2/2002 | Parikh et al. .................. 524/578 |
| 6,525,148 B1 | 2/2003 | McDaniel et al. |
| 6,833,415 B2 | 12/2004 | Kendrick et al. |
| 6,946,521 B2 | 9/2005 | Miserque et al. |
| 7,312,283 B2 | 12/2007 | Martin et al. |
| 2001/0001795 A1 | 5/2001 | McDaniel et al. |
| 2003/0149180 A1 | 8/2003 | Van Dun et al. |
| 2005/0126256 A1 | 6/2005 | Corleto |
| 2005/0153830 A1 | 7/2005 | Jensen et al. |
| 2005/0239976 A1 | 10/2005 | McDaniel et al. |
| 2005/0245689 A1 | 11/2005 | Krishnaswamy et al. |
| 2007/0197374 A1 | 8/2007 | Yang et al. |

FOREIGN PATENT DOCUMENTS

| | | |
|---|---|---|
| EP | 0 665 950 B1 | 8/1995 |
| WO | 2005068550 A1 | 7/2005 |
| WO | WO 2005/092974 A1 | 10/2005 |
| WO | 2005108439 A2 | 11/2005 |
| WO | 2005108439 A3 | 11/2005 |
| WO | 2007024773 A1 | 3/2007 |

OTHER PUBLICATIONS

Hubert et al., Journal of Applied Polymer Science 84 (2002) 2308-2317.*
Kim, Jung Dae, et al., "Copolymerization of Ethylene and a-Olefins with Combined Metallocene Catalysts. III. Production of Polyolefins with Controlled Microstructures," Journal of Polymer Science: Part A: Polymer Chemistry, vol. 38, 2000, pp. 1427-1432.
U.S. patent application entitled "Polymerization Catalysts and Process for Producing Bimodal Polymers in a Single Reactor," by Kumundini C. Jayaratne, filed Sep. 15, 2005, as U.S. Appl. No. 11/208,077.
U.S. patent application entitled "Multimodal Polyethylene Compositions and Piper Made From Same," by Joel L. Martin, filed Nov. 2, 2005, as U.S. Appl. No. 11/264,900.
U.S. patent application entitled "Polymerization Catalysts for Producing High Molecular Weight Polymers with Low Levels of Long Chain Branching," by Qing Yang, filed Feb. 22, 2006, as U.S. Appl. No. 11/359,972.
Laun, H.M., et al., "Transient Elongational Viscosities and Drawability of Polymer Melts," Journal of Rheology, vol. 33, No. 1, 1989, pp. 119-175.
Kim, Jung Dae, et al., "Polymerization of Ethylene and α-Olefins with Combined Metallocene Catalysts. III. Production of Polyolefins with Controlled Microstructures," Journal of Polymer Science: Part A: Polymer Chemistry, vol. 38, 2000, pp. 1427-1432.
Hubert, L., et al., "Physical and Mechanical Properties of Polyethylene for Pipes in Relation to Molecular Architecture. II. Short-Term Creep of Isotropic and Drawn Materials," Journal of Applied Polymer Science, vol. 84, 2002, pp. 2308-2317.
Krishnaswamy, Rajendra K., "Analysis of ductile and brittle failures from creep rupture testing of high-density polyethylene (HDPE) pipes," Polymer 46, 2005, pp. 11664-11672.

(Continued)

*Primary Examiner*—Roberto Rábago
(74) *Attorney, Agent, or Firm*—Conley Rose, P.C.; Rodney B. Carroll; Cheryl L. Huseman

(57) ABSTRACT

A polymer composition comprising a density equal to or greater than about 0.947 g/cc, a high load melt index from about 1 g/10 min to about 30 g/10 min, and a tensile natural draw ratio less than about 14167 ρ-12958, where ρ is the density (g/cc) of the composition. A polymer composition comprising a tensile natural draw ratio less than about 14167ρ-12958, where ρ is the density (g/cc) of the composition and wherein less than about 1 weight percent of the composition comprises non-polymeric additives.

35 Claims, 4 Drawing Sheets

OTHER PUBLICATIONS

Foreign communication from a related counterpart application—International Search Report, App No. PCT/US2007/062546, Aug. 14, 2007, 6 pgs.

DOW News Center- Dow Continuum* Bimodal Polyethylene Resin Chosen for PSE&G Natural Gas Pipe System, Apr. 29, 2005, 2 pages, XP-002437238, Houston, TX.

Laurent, E., "Comprehensive Evaluation of the Long-Term Mechanical Properties of PE100 Resins Meeting the Requirements of Modern Installation Techniques," Plastics pipes XI, Oct. 2001, search result (1 pg.) and pp. 63-73.

"The Plastics Pipe Institute—Handbook of Polyethylene Pipe; Chapter 3 Engineering Properties" The Plastics Pipe Institute, Jan. 2006, search result (1 pg.), Table of Contents (14 pgs.), book cover (1 pg.), pp. 47-106, Washington, DC.

* cited by examiner

POLYETHYLENE COMPOSITIONS AND PIPE MADE FROM SAME

CROSS-REFERENCE TO RELATED APPLICATIONS

The subject matter of the present application is related to U.S. patent application Ser. No. 11/264,900 filed on Nov. 2, 2005, now U.S. Patent Application Publication No. US 2007-0043182 A1, and entitled "Multimodal Polyethylene Compositions and Pipe Made From Same," and Ser. No. 11/359,972 filed on Feb. 22, 2006, now U.S. Patent Application Publication No. US 2007-0197374 A1, and entitled "Dual Metallocene Catalysts for Polymerization of Bimodal Polymers," each of which is hereby incorporated herein by reference in its entirety for all purposes.

FIELD OF THE INVENTION

The present disclosure relates to polymer compositions and pipe made from same, more specifically to polyethylene compositions for the manufacture of high-pressure rated pipe.

BACKGROUND OF THE INVENTION

Polymeric pipes have replaced metal pipes in many applications such as for high-pressure fluid and natural gas transportation. Polymeric pipes have several advantages over metal pipes including being of relatively lighter weight, more corrosion resistant, inexpensive, more thermally and electrically insulative, tougher, more durable and more easily shaped during manufacture. Such pipes are exposed to numerous stresses during their lifetime that may result in cracks or breaks that are expensive to repair, especially in situations where the pipe is buried in a structure or underground. As such, polymeric pipes may be required to meet industry-defined standards depending on their intended use. Polymeric material used in the fabrication of pipe has often been optimized to provide a more durable end-use article for example; higher density polyethylene resins have been developed for pipe applications.

High-density polyethylene (HDPE) is widely used in the fabrication of pipes for the high-pressure transport of resources such as natural gas because of its ease of processing and its excellent balance between stiffness and fracture toughness. The polymer resin density (and consequently the density of the resultant pipe) is directly correlated to the load-bearing capacity (or design stress) of the pipe where the higher the polymer resin density the higher the load-bearing capacity of the resultant pipe as described in the article by Rajendra K. Krishnaswamy entitled "Analysis of ductile and brittle failures from creep rupture testing of high-density polyethylene (HDPE) pipes" published in 2005 in Polymer; Volume 46; Issue 25; pages 11664-11672 which is incorporated by reference herein in its entirety. However, pipes for high-pressure gas transport applications must also have adequate resistance to slow crack growth (SCG) as this is the most common mode of failure for pipes in service. Generally speaking, increasing the density of the polymer resin decreases the SCG resistance of the resin and the resultant pipe. Therefore, a need exists for HDPE resins intended for high-pressure-pipe applications to have a good balance between density and SCG resistance.

SUMMARY OF THE INVENTION

Disclosed herein is a polymer composition comprising a density equal to or greater than about 0.947 g/cc, a high load melt index from about 1 g/10 min to about 30 g/10 min, and a tensile natural draw ratio less than about $14167\rho-12958$, where $\rho$ is the density (g/cc) of the composition.

Also disclosed herein is a polymer composition comprising a tensile natural draw ratio less than about $14157\rho-12958$, where $\rho$ is the density (g/cc) of the composition and wherein less than about 1 weight percent of the composition comprises non-polymeric additives.

DETAILED DESCRIPTION OF THE INVENTION

Figure 1:
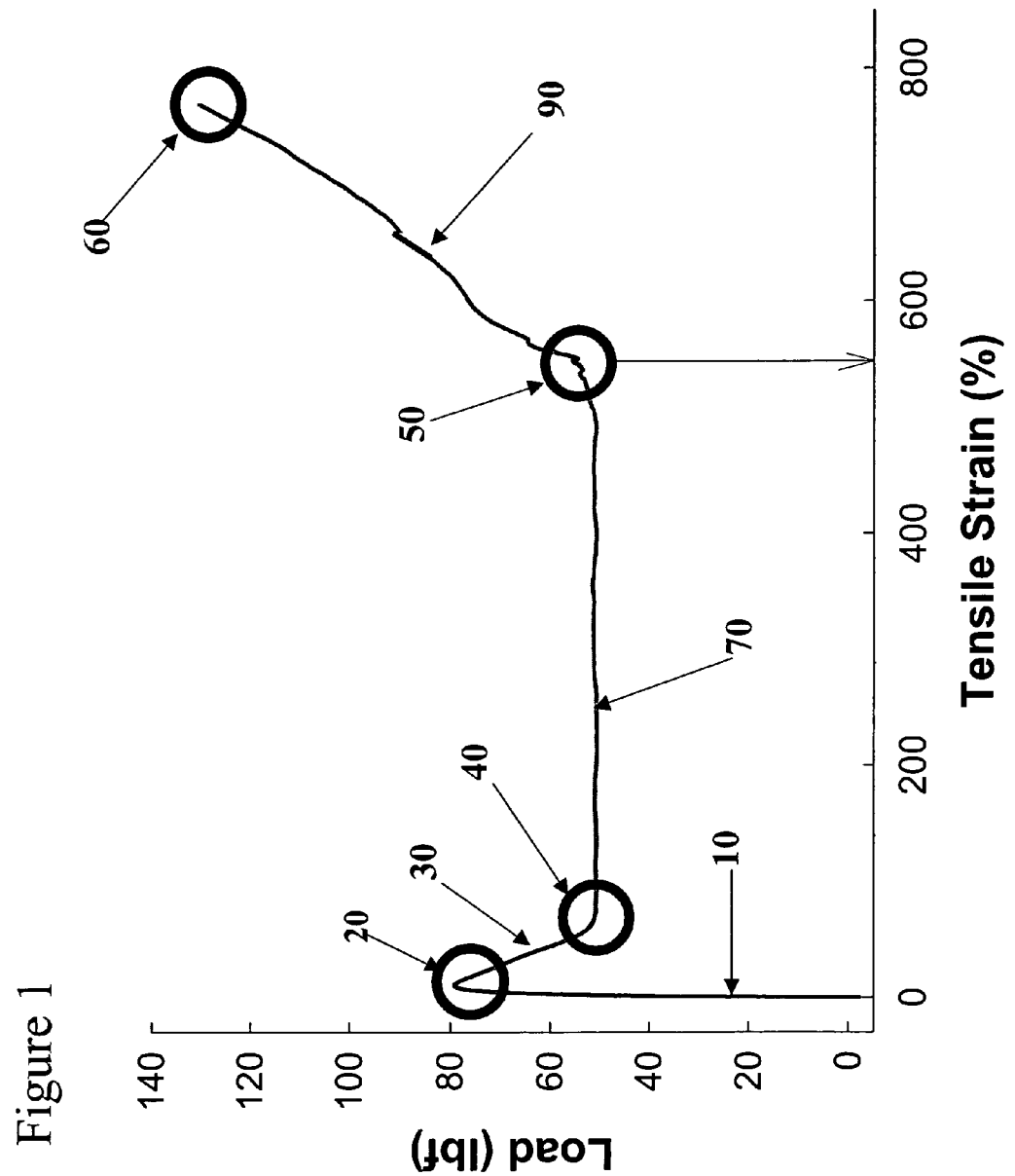
FIG. 1 is a representative tensile stress-strain curve.

Disclosed herein are polyethylene (PE) compositions, PE pipes, and methods of making same. Such methods may comprise preparing a PE composition and forming the composition into a pipe. The PE composition may comprise a PE base resin and optionally additives or modifiers. In an aspect, the PE composition comprises a bimodal PE resin and the pipe prepared therefrom may display enhanced physical properties such as increased resistance to SCG.

The PE base resin may be a unimodal resin, alternatively a multimodal resin. Herein, the "modality" of a polymer resin refers to the form of its molecular weight distribution curve, i.e. the appearance of a graph of the polymer weight fraction, frequency, or number as a function of its molecular weight. The polymer weight fraction refers to the weight fraction of molecules of a given size. A polymer having a molecular weight distribution curve showing a single peak may be referred to as a unimodal polymer, a polymer having a curve showing two distinct peaks may be referred to as a bimodal polymer, a polymer having a curve showing three distinct peaks may be referred to as a trimodal polymer, etc. Polymers having molecular weight distribution curves showing more than one peak may be collectively referred to as multimodal polymers or resins.

A polymer resin may have two or more components that may be distinguishable from one another, for example based upon their individual composition and/or molecular weight distribution. A molecular weight distribution curve may be prepared for each individual component of the polymer resin. For example, the molecular weight distribution curve for the individual components of the polymer resin may display a single peak and thus be unimodal. The molecular weight distribution curves for the individual components may be superimposed onto a common chart to form the weight distribution curve for the polymer resin as a whole. Upon such superimposition, the resultant curve for the polymer resin as a whole may be multimodal or show n distinct peaks corresponding to n polymer components of differing molecular weight distributions. For example, a bimodal polymer resin may show two distinct peaks corresponding to two individual components of differing molecular weights. Said bimodal polymer resin may have a first component that may be generally characterized as a higher molecular weight polymer component and a second component that may be generally characterized as a lower molecular weight polymer component. Alternatively, superimposition of the molecular weight distribution curves from the individual components may show a single peak that is broadened in comparison with the curves for the individual components corresponding to polymer fractions having different but overlapping molecular weight distributions. In an embodiment, the multimodal PE composition comprises a bimodal PE base resin. The remainder of the discussion will focus on a bimodal PE compositions with the understanding that other polymeric compositions, for example having different modality, may be employed in various aspects and embodiments as would be apparent to one skilled in the art.

The PE composition and/or individual components of the PE composition may comprise a homopolymer, a copolymer, or blends thereof. In an embodiment, the components of the PE composition may be a copolymer comprised of a polymer of ethylene with one or more comonomers such as alpha olefins. In an embodiment, the PE composition comprises a higher molecular weight ethylene/1-olefin copolymer (HMW) component and a lower molecular weight ethylene/1-olefin copolymer (LMW) component. The comonomer of the HMW component of the PE composition may be the same as or different from the comonomer of the LMW component. Examples of suitable comonomers include without limitation unsaturated hydrocarbons having from 3 to 20 carbon atoms such as propylene, 1-butene, 1-pentene, 1-hexene, 3-methyl-1-butene, 4-methyl-1-pentene, 1-heptene, 1-octene, 1-nonene, 1-decene, and mixtures thereof. In an embodiment, the comonomer for the LMW component and HMW component of the PE composition is 1-hexene.

Such PE compositions may be prepared by any means known to one skilled in art, for example by employing a multi-catalyst system in at least one reactor, series reactors, parallel reactors, blending in at least one reactor, physical blending, or any other physical means, or by varying the comonomers in the polymerization reaction, as will be described in more detail herein. Such PE compositions may have a variety of properties and parameters described below either singularly or in combination. Methods for determination of these properties and parameters are known to one of ordinary skill in the art.

The molecular weight distribution (MWD) of the PE composition may be characterized by the ratio of the weight average molecular weight to the number average molecular weight, which is also referred to as the polydispersity index (PDI) or more simply as polydispersity. The number average molecular weight ($M_n$) is the common average of the molecular weights of the individual polymers calculated by measuring the molecular weight of n polymer molecules, summing the weights, and dividing by n. The weight average molecular weight ($M_w$) of a polymer composition is calculated according to equation 1:

$$M_w = \frac{\sum_i n_i M_i^2}{\sum_i n_i M_i} \quad (1)$$

where $n_i$ is the number of molecules of molecular weight $M_i$. All molecular weight averages are expressed in gram per mole (g/mol). Various moments of the MWD include $M_n$, $M_w$, $M_z$, and $M_v$.

In an embodiment, the HMW component may have a PDI of equal to or less than about 5.5, alternatively equal to or less than about 5.0, alternatively equal to or less than about 4.5, or alternatively, equal to or less than about 4.0. In an embodiment, the LMW component may have a PDI of equal to or less than about 10, alternatively equal to or less than about 8, alternatively equal to or less than about 7, or alternatively, equal to or less than about 6. The resultant PE composition (i.e. including both the LMW and HMW components) may have a broad MWD of equal to or greater than about 8, alternatively equal to or greater than about 10, or alternatively equal to or greater than about 12.

The high load melt index (HLMI) represents the rate of flow of a molten resin through an orifice of 0.0825 inch diameter when subjected to a force of 21,600 grams at 190° C. as determined in accordance with ASTM D 1238. The PE compositions of this disclosure may have a HLMI of from about 1 g/10 min to about 30 g/10 min, alternatively from about 2 g/10 min to about 25 g/10 min, or alternatively from about 2 g/10 min to about 20 g/10 min.

The PE compositions of this disclosure may be further characterized by having a density of from about 0.947 g/cc to about 0.955 g/cc, alternatively equal to or greater than about 0.947 g/cc. The density refers to the mass per unit volume of polymer and may be determined in accordance with ASTM D 1505.

The PE composition of the present invention can be polymerized by any olefin polymerization method known in the art, using various types of polymerization reactors. As used herein, "polymerization reactor" includes any polymerization reactor capable of polymerizing olefin monomers to produce homopolymers or copolymers. Such homopolymers and copolymers are referred to as resins, polymers, polyolefins, or PE. These could include slurry, gas-phase, solution, high pressure, tubular or autoclave reactors. Gas phase reactors may comprise fluidized bed reactors or staged horizontal reactors. Slurry reactors may comprise vertical or horizontal loops. High-pressure reactors may comprise autoclave or tubular reactors. Reactor types can include those that may be referred to as continuous or batch. Continuous processes could use intermittent or continuous product discharge. Processes may also include partial or full direct recycle of un-reacted monomer, un-reacted comonomer, and/or diluent.

Polymerization reactor systems of the present invention may comprise one type of reactor in a system or multiple reactors of the same or different type. Production of polymers in multiple reactors may include several stages in at least two separate polymerization reactors interconnected by a transfer device making it possible to transfer the polymers resulting from the first polymerization reactor into the second reactor. The desired polymerization conditions in one of the reactors may be different from the operating conditions of the other reactors. Alternatively, polymerization in multiple reactors may include the manual transfer of polymer from one reactor to subsequent reactors for continued polymerization. Multiple reactor systems may include any combination including, but not limited to, multiple loop reactors, multiple gas reactors, a combination of loop and gas reactors, multiple high-pressure reactors or a combination of high pressure with loop and/or gas reactors. The multiple reactors may be operated in series or in parallel.

According to one aspect of the invention, the polymerization reactor system may comprise at least one loop slurry reactor. Such reactors are known in the art and may comprise vertical or horizontal loops. Monomer, diluent, catalyst and optionally any comonomer may be continuously fed to a loop reactor where polymerization occurs. Generally, continuous processes may comprise the continuous introduction of a monomer, a catalyst, and a diluent into a polymerization reactor and the continuous removal from this reactor of a suspension comprising polymer particles and the diluent. Reactor effluent may be flashed to separate the solid polymer from the liquids that comprise the diluent, monomer and/or comonomer. Various technologies may be used for this separation step including but not limited to, flashing that may include any combination of heat addition and pressure reduction; separation by cyclonic action in either a cyclone or hydrocyclone; or separation by centrifugal force.

A typical slurry polymerization process (also known as the particle form process), which is well known in the art is disclosed, for example, in U.S. Pat. Nos. 3,248,179, 4,501, 885, 5,565,175, 5,575,979, 6,239,235, 6,262,191 and 6,833, 415, each of which is incorporated by reference in its entirety herein.

Suitable diluents used in slurry polymerization are well known in the art and include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another aspect of this invention, the polymerization reactor may comprise at least one gas phase reactor. Such systems are known in the art and may employ a continuous recycle stream containing one or more monomers continuously cycled through a fluidized bed in the presence of the catalyst under polymerization conditions. A recycle stream may be withdrawn from the fluidized bed and recycled back into the reactor. Simultaneously, polymer product may be withdrawn from the reactor and new or fresh monomer may be added to replace the polymerized monomer. Such gas phase reactors may comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4588,790 and 5,436, 304, each of which is incorporated by reference in its entirety herein.

According to still another aspect of the invention, a high-pressure polymerization reactor may comprise a tubular reactor or an autoclave reactor, both of which are known in the art. Tubular reactors may have several zones where fresh monomer, initiators, or catalysts are added. Monomer may be entrained in an inert gaseous stream and introduced at one zone of the reactor. Initiators, catalysts, and/or catalyst components may be entrained in a gaseous stream and introduced at another zone of the reactor. The gas streams may be intermixed for polymerization. Heat and pressure may be employed appropriately to obtain optimal polymerization reaction conditions.

According to yet another aspect of the invention, the polymerization reactor may comprise a solution polymerization reactor wherein the monomer is contacted with the catalyst composition by suitable stirring or other means. A carrier comprising an inert organic diluent or excess monomer may be employed. If desired, the monomer may be brought in the vapor phase into contact with the catalytic reaction product, in the presence or absence of liquid material. The polymerization zone is maintained at temperatures and pressures that will result in the formation of a solution of the polymer in a reaction medium. Agitation may be employed to obtain better temperature control and to maintain uniform polymerization mixtures throughout the polymerization zone. Adequate means are utilized for dissipating the exothermic heat of polymerization. These reactors are known in the art.

Polymerization reactors suitable for the present invention may further comprise any combination of at least one raw material feed system, at least one feed system for catalyst or catalyst components, and/or at least one polymer recovery system. Suitable reactor systems for the present invention may further comprise systems for feedstock purification, catalyst storage and preparation, extrusion, reactor cooling, polymer recovery, fractionation, recycle, storage, loadout, laboratory analysis, and process control.

Conditions that are controlled for polymerization efficiency and to provide resin properties include temperature, pressure and the concentrations of various reactants. Polymerization temperature can affect catalyst productivity, polymer molecular weight and molecular weight distribution. Suitable polymerization temperature may be any temperature below the de-polymerization temperature according to the Gibbs Free energy equation. Typically this includes from about 60° C. to about 280° C., for example, and from about 70° C. to about 110° C., depending upon the type of polymerization reactor.

Suitable pressures will also vary according to the reactor and polymerization type. The pressure for liquid phase polymerizations in a loop reactor is typically less than 1000 psig. Pressure for gas phase polymerization is usually at about 200-500 psig. High pressure polymerization in tubular or autoclave reactors is generally run at about 20,000 to 75,000 psig. Polymerization reactors can also be operated in a supercritical region occurring at generally higher temperatures and pressures. Operation above the critical point of a pressure/temperature diagram (supercritical phase) may offer advantages.

The concentration of various reactants can be controlled to produce resins with certain physical and mechanical properties. The proposed end-use product that will be formed by the resin and the method of forming that product determines the properties. Mechanical properties include tensile, flexural, impact, creep, fracture (impact and slow crack growth) resistance, stress relaxation and hardness tests. Physical properties include density, molecular weight, molecular weight distribution, melting temperature, glass transition temperature, crystallization temperature, stereoregularity, long chain branching and melt rheology.

The concentrations of monomer, co-monomer, hydrogen, co-catalyst, modifiers, and electron donors are important in producing these resin properties. Comonomer is used to control product density. Hydrogen can be used to control product molecular weight. Co-catalysts can be used to alkylate, scavenge poisons and control molecular weight. Modifiers can be used to control product properties and electron donors affect stereoregularity. In addition, the concentration of poisons is minimized because poisons impact the reactions and product properties.

Any catalyst composition capable of producing a PE composition may be employed in the production of the PE composition. Typical catalyst compositions that can be employed include supported chromium catalysts, Ziegler-Natta catalysts, metallocene catalysts, or combinations thereof. For example, a catalyst composition for the production of a PE composition may include at least two metallocenes that are selected such that the polymers produced therefrom have two distinctly different molecular weights. The first metallocene may be used to produce the HMW component, and may be a tightly bridged metallocene containing a substituent that includes a terminal olefin. The second metallocene, that may be used to produce the LMW component, is generally not bridged and is more responsive to chain termination reagents, such as hydrogen, than the first metallocene. The metallocenes may be combined with an activator, an aluminum alkyl compound, an olefin monomer, and an olefin comonomer to produce the desired bimodal polyolefin. The activity and the productivity of the catalyst may be relatively high. As used herein, the activity refers to the grams of polymer produced per gram of solid catalyst charged per hour, and the productivity refers to the grams of polymer produced per gram of solid catalyst charged. Such catalysts are disclosed in U.S. patent application Ser. No. 11/209,006, filed Aug. 22, 2005, now U.S. Pat. No. 7,312,283, and entitled "Polymerization Catalysts And Process For Producing Bimodal Polymers In A Single Reactor," and U.S. patent application Ser. No. 11/208,077, filed Sep. 15, 2005, now U.S. Pat. No. 7,226,886, and entitled "Polymerization Catalysts and Process for Producing Bimodal Polymers in a Single Reactor," each of which is incorporated herein by reference in its entirety.

In an embodiment, a catalyst composition comprises a first metallocene compound, a second metallocene compound, an activator and optionally an organoaluminum compound. The first metallocene compound has the formula:

$$(X^1R^1)(X^2R^2{}_2)(X^3)(X^4)M^1;$$

wherein $(X^1)$ is cyclopentadienyl, indenyl, or fluorenyl, $(X^2)$ is fluorenyl, and $(X^1)$ and $(X^2)$ are connected by a disubstituted bridging group comprising one atom bonded to both $(X^1)$ and $(X^2)$, wherein the atom is carbon or silicon. A first substitutent of the disubstituted bridging group is an aromatic or aliphatic group having from 1 to about 20 carbon atoms. A second substitutent of the disubstituted bridging group can be an aromatic or aliphatic group having from 1 to about 20 carbon atoms, or the second substitutent of the disubstituted bridging group is an unsaturated aliphatic group having from 3 to about 10 carbon atoms. $R^1$ is H, or an unsaturated aliphatic group having from 3 to about 10 carbon atoms. $R^2$ is H, an alkyl group having from 1 to about 12 carbon atoms, or an aryl group; $(X^3)$ and $(X^4)$ are independently an aliphatic group, an aromatic group, a cyclic group, a combination of aliphatic and cyclic groups, or a substituted derivative thereof, having from 1 to about 20 carbon atoms, or a halide; and $M^1$ is Zr or Hf. The first substitutent of the disubstituted bridging group may be a phenyl group. The second substitutent of the disubstituted bridging group may be a phenyl group, an alkyl group, a butenyl group, a pentenyl group, or a hexenyl group.

The second metallocene compound has the formula:

$$(X^5)(X^6)(X^7)(X^8)M^2;$$

wherein $(X^5)$ and $(X^6)$ are independently a cyclopentadienyl, indenyl, substituted cyclopentadienyl or a substituted indenyl, each substitutent on $(X^5)$ and $(X^6)$ is independently selected from a linear or branched alkyl group, or a linear or branched alkenyl group, wherein the alkyl group or alkenyl group is unsubstituted or substituted, any substituent on $(X^5)$ and $(X^6)$ having from 1 to about 20 carbon atoms; $(X^7)$ and $(X^8)$ are independently an aliphatic group, an aromatic group, a cyclic group, a combination of aliphatic and cyclic groups, or a substituted derivative thereof, having from 1 to about 20 carbon atoms; or a halide, and $M^2$ is Zr or Hf.

In an embodiment of the present disclosure, the ratio of the first metallocene compound to the second metallocene compound may be from about 1:10 to about 10:1. According to other aspects of the present disclosure, the ratio of the first metallocene compound to the second metallocene compound may be from about 1:5 to about 5:1. According to yet other aspects of the present disclosure, the ratio of the first metallocene compound to the second metallocene compound may be from about 1:2 to about 2:1.

In an embodiment of the present disclosure, the activator may be a solid oxide activator-support, a chemically treated solid oxide, a clay mineral, a pillared clay, an exfoliated clay, an exfoliated clay gelled into another oxide matrix, a layered silicate mineral, a non-layered silicate mineral, a layered aluminosilicate mineral, a non-layered aluminosilicate mineral, an aluminoxane, a supported aluminoxane, an ionizing ionic compound, an organoboron compound, or any combination thereof. The terms "chemically-treated solid oxide", "solid oxide activator-support", "acidic activator-support", "activator-support", "treated solid oxide compound", and the like are used herein to indicate a solid, inorganic oxide of relatively high porosity, which exhibits Lewis acidic or Brønsted acidic behavior, and which has been treated with an electron-withdrawing component, typically an anion, and which is calcined. The electron-withdrawing component is typically an electron-withdrawing anion source compound. Thus, the chemically-treated solid oxide compound comprises the calcined contact product of at least one solid oxide compound with at least one electron-withdrawing anion source compound. Typically, the chemically-treated solid oxide comprises at least one ionizing, acidic solid oxide compound. The terms "support" and "activator-support" are not used to imply these components are inert, and such components should not be construed as an inert component of the catalyst composition.

The organoaluminum compound used with the present disclosure may have the formula:

$$(R^3)_3Al;$$

in which $(R^3)$ is an aliphatic group having from 2 to about 6 carbon atoms. In some instances, $(R^3)$ is ethyl, propyl, butyl, hexyl, or isobutyl.

In an embodiment, the catalysts are chosen from compounds like those represented by the chemical structures A and B with sulfated alumina as the activator-support and with tri-isobutylaluminum (TIBA) as the co-catalyst.

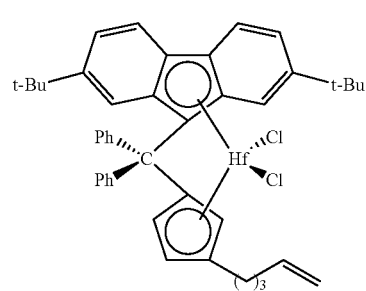

A

-continued

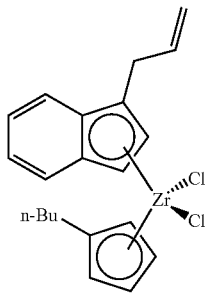
B

The PE compositions of this disclosure and/or the base PE resin may include other additives as known to those skilled in the art. Examples of additives include, but are not limited to, antistatic agents, colorants, stabilizers, nucleators, surface modifiers, pigments, slip agents, antiblocks, tackafiers, polymer processing aids and combinations thereof. In an embodiment, the PE composition comprises carbon black. Such additives may be used singularly or in combination and may be included in the polymer composition before, during or after preparation of the PE composition as described herein. In an embodiment, the compositions disclosed herein comprise less than about 1 weight percent of nonpolymeric additives. Such additives may be added via known techniques, for example during an extrusion or compounding step such as during pelletization or subsequent processing into an end use article. PE compositions as described herein may be formed into various articles, including but not limited to, household containers, utensils, film products, drums, fuel tanks, pipes, geomembranes, and liners.

In an embodiment, the PE composition of this disclosure is fabricated into a pipe by extrusion. Extrusion refers to a method of making a polymeric pipe comprising extruding the polymer or copolymer in a molten state through a die to cool and form the polymeric pipe.

Pipe extrusion in the simplest terms is performed by conveying solid polymer pellets through the action of a rotating screw followed by the compaction and melting of the pellets through the application of heat and shear forces; the homogenous polymer melt is then conveyed to the die to form the ultimately desired profile. For the fabrication of pipes the extrudate (melt exiting the die), which is annular in shape, is then formed and cooled through a series of vacuum and water cooling tanks. There are numerous kinds of feedstocks in pipe extrusion. The polymer feedstock can either be a pre-pigmented polyethylene resin or it can be a mixture of natural polyethylene and color concentrate (referred to as "Salt and Pepper blends"). In North America, the most common feedstock for pipe extrusion is "Salt and Pepper blends". In Europe and other areas of the world, the most common feedstock for pipe extrusion is pre-pigmented polyethylene resin. Feedstock is rigidly controlled to obtain the proper finished product (pipe) and ultimate consumer specifications. In one "salt and pepper blend" embodiment, the color concentrate is a polyethylene carrier resin loaded with up to 40 weight percent carbon black particles; this concentrate is introduced to maintain approximately 2.5 weight percent carbon black concentration in the final pipe.

The feedstock is then fed into an extruder. The most common extruder system for pipe production is a single-screw extruder. The purpose of the extruder is to melt, homogenize and convey the polyethylene pellets. Extrusion temperatures typically range from 170° C. to 260° C. depending upon the extruder screw design and flow properties of the polyethylene.

The molten polymer is then passed through an annular die to shape the melt. The molten polymer, in the form of an annulus, is then usually forced through a shaping or forming tank while simultaneously being cooled from the outside using a water spray. While the pipe diameter is a direct consequence of the die and sizing sleeve dimensions, the pipe wall thickness depends on the die gap and also the draw-down speed employed.

Next, the pipe is cooled and solidified in the desired dimensions. Cooling is accomplished by the use of several water tanks where the outside pipe is either submerged in water or water is sprayed on the pipe exterior. The pipe is cooled from the outside surface to the inside surface. The interior wall and inside surfaces of the pipe can stay hot for a long period of time, as polyethylene is a poor conductor of heat. Finally, the pipe is printed and either coiled or cut to length.

In an embodiment, the polymeric pipe fabricated from PE compositions of this disclosure display enhanced mechanical properties such as resistance to slow crack growth, decreased tensile natural draw ratio (NDR), resistance to rapid crack propagation and strength sufficient to warrant the designation PE100. The designation PE100 refers to a pressure rating wherein the pipe has a minimum required strength value (50 year extrapolated value at 20° C.; 97.5 lower prediction limit) equal to or greater than 10.0 MPa. Such pipes may display the properties described below either singularly or in combination. The specific methods for determination of these properties are described in more detail herein.

When a pressurized PE pipe is subjected to an instantaneous and intense impact, a pre-existing or consequently initiated crack or flaw can propagate axially at speeds in excess of 100 m/s. Such an event is referred to as Rapid Crack Propagation or RCP. The Small-Scale Steady-State (S4) test is a current standard for measuring RCP resistance. In the S4 test, the pipe specimens are seven diameters long and are sealed at both ends and pressurized with air. Typically, pipe specimens are conditioned externally at the test temperature, and then moved to the S4 rig for testing. A sharp chisel-edged striker impacts the pipe at one end and drives a fast-running crack through the main section of the pipe. While the crack propagates, internal disc baffles spaced along the pipe length suppress axial decompression ahead of it, so that the pressure at the crack-tip is approximately equal to the test pressure during the entire course of crack growth. This promotes steady-state crack growth. Further, in the S4 test, a containment cage around the specimen prevents flaring of the pipe. This also limits the failure mode to steady-state crack propagation while minimizing ductile transient bursting. The S4 test details and procedures are described in the ISO 13477 standard. The test can be performed at a fixed temperature to determine the critical pressure ($P_c$) required to sustain RCP. Alternatively, a series of tests at a given/fixed operating pressure (usually 5 bars) and at various temperatures can be used to measure the critical temperature ($T_c$) for RCP to be sustained. Generally speaking, the temperature of a pipe must be below a critical limit even for RCP to be initiated. Once RCP is initiated, the pressure within the pipe must exceed a critical value to sustain steady state crack propagation. Therefore, for a pipe, low S4 $T_c$ and high S4 $P_c$ will help minimize RCP failures.

The lower the S4 critical temperature the better, since it results in a broader end-use temperature range for the pipe. A pipe fabricated from the PE compositions disclosed herein, having an 2-inch nominal outer diameter with a standard diameter ratio (SDR=OD/t, where t=wall thickness) of about 11, may have a critical temperature value determined according to ISO DIS 13477 (S4 test) of equal to or less than about −10° C., alternatively equal to or less than about −13° C., alternatively equal to or less than about −16° C.

A modified Charpy impact test, referred to as the Razor-Notched Charpy Impact Test, has emerged as a useful indicator of the resistance to RCP fractures. This modified Charpy test is described in detail in ASTM F 2231. This test involves measuring the impact energy when a thin molded rectangular plaque (with a razor notch) is impacted by a swinging pendulum. This test can be performed at multiple temperatures; enabling one to determine the temperature at which the failure mode changes from ductile to brittle. The results from this test are as follows: (i) impact energy (in Joules) at room temperature and (ii) the lowest temperature at which the failure was clearly ductile (hinge break with an impact energy>0.15 J); for convenience, this temperature will be referred to as the Charpy $T_{db}$. Generally speaking, a higher room-temperature impact energy and a lower Charpy $T_{db}$ means the ensuing pipe will have better RCP resistance.

The PE compositions disclosed herein may have a Charpy $T_{db}$ less than about −15° C. and a room-temp impact energy greater than about 0.7 J; alternatively, the Charpy $T_{db}$ may be less than about −20° C. and the room-temp impact energy greater than about 0.8 J; or alternatively, the Charpy $T_{db}$ may be less than about −25° C. and the room-temp impact energy greater than about 0.85 J.

HDPE pipes used for gas transport are under pressure for the duration of their useful service. Often, fluctuations in pressure render the load to be dynamic. Therefore, it is important to establish the maximum load that such a pipe can withstand without deformation and damage over the expected lifetime (typically, many decades). The design stress and the useful service lifetime of HDPE pipes are typically estimated by performing creep rupture tests at multiple temperatures. In this test (ASTM D 1598), the pipe of interest is subjected to a certain hydrostatic pressure (expressed as hoop stress) and the failure time is recorded; failure is defined as a continuous loss of pressure (leakage) from within the pipe. Typically, a log-log plot of pipe hoop stress versus failure time is constructed and extrapolated to a desired lifetime. The corresponding hoop stress at the desired lifetime and temperature from the above-mentioned plot is used as the design stress (after the application of an appropriate safety factor) for the application of interest.

In order to predict the design stress and durability of such pressure pipes, accelerated testing is conducted at elevated temperatures. In other words, for a given pipe and hoop stress level, failure occurs at shorter times with increasing temperature. The general procedure to estimate the design stress and durability of HDPE pipes requires creep rupture failure data spread uniformly over a two-year timeframe at the end-use temperature (usually room temperature) and at two or three higher temperatures (typically in the 40-80° C. range). Subsequently, principles of time-temperature superposition are applied to the data; this allows one to reasonably extrapolate the failure data at room temperature to a few decades.

The design stress of a plastic pipe is often referred to as its long-term hydrostatic strength (LTHS) or the minimum required strength (MRS). LTHS, estimated using ASTM D 2837 (USA standard), is the estimated tensile stress in the wall of a pipe in the circumferential orientation which, when applied continuously, will cause failure of the pipe at 100,000 hours. The MRS of a pipe, estimated using the ISO 9080 standard, is the functional equivalent of the LTHS (with a desired lifetime of 50 years) used internationally. The LTHS and/or MRS of a pipe are used to certify gas pipes according to either ASTM D 2513 and/or ISO 4437. In other words, these values determine the maximum load that such pipes can bear during their utilization for the transportation of natural gas.

An MRS value (50 year extrapolated value at 20° C.; 97.5 lower predictive limit (LPL)) greater than 10.0 MPa corresponds to PE100 pressure rating. A PE80 pressure rating means the MRS was greater than 8.0 MPa and less than 10.0 MPa. Based on limited creep rupture testing at 23° C., 60° C. and 80° C., the MRS of a pipe (2 inch nominal OD with a SDR of about 11.0) from PE compositions disclosed herein is projected to be greater than 10.0 MPa.

A majority of the field failures in pressure pipe applications are attributable to slow crack growth (SCG). This has led to the development of many lab-scale tests, such as the Pennsylvania Edge-Notch Tensile Test (PENT; ASTM F1473), to predict the resistance to SCG of various polyethylenes. In the PENT test, a notched polyethylene specimen is subjected to creep by the application of a constant tensile load at 80° C. The applied load is such that the initial stress is 2.4 MPa. The time to failure is recorded and reported. A longer failure time correlates with a greater resistance to SCG. Generally speaking, increasing the resin density lowers the PENT failure times. The PE compositions of this disclosure display PENT failure times in excess of 3000 hours, alternatively in excess of 4000 hours, alternatively in excess of 5000 hours, alternatively in excess of 6000 hours, alternatively in excess of 7000 hours.

The PENT test time may be shortened by simply increasing the initial load applied in order to accelerate the fracture process. A "high-stress" PENT is defined as the failure time for an initial applied load of 3.8 MPa (increased from the 2.4 MPa prescribed in ASTM F1473) and unchanged specimen geometry. The PE compositions of this disclosure display high-stress PENT failure times in excess of 7000 hours. Given that the density of the PE compositions of this disclosure are high (>0.952 g/cc), this is considered to be a significant result. For reference, all commercially available PE100 rated polymers, at a density less than 0.951 g/cc, display high-stress PENT failure times considerably less than 3000 hours.

Since the majority of field failures in pressure pipe (gas transport) applications are attributable to a brittle fracture mode referred to as SCG, the resistance to SCG of pressure pipe is often evaluated. One method of evaluating the SCG resistance is by determining the tensile natural draw ratio (tensile NDR) of the resin. There is some evidence that the tensile NDR is directly related to the SCG resistance of HDPE such that the lower the tensile NDR the higher the resistance to SCG. A description of the correlation of SCG to tensile NDR may be found in: E. Laurent, *Comprehensive Evaluation of the Long-Term Mechanical Properties of PE100 Resin Meeting the Requirements of Modern Installation Techniques*, Plastic Pipes XI Proceedings of the International Conference, Woodhead Publishing Limited (2001); and in an article by L. Hubert, et al published in 2002 in the Journal of Applied Polymer Science Volume 84 page 2308 each of which is incorporated herein by reference herein in its entirety.

The tensile NDR is determined by performing standard tensile stress-strain experiments on dogbone specimens at a deformation rate of 51 mm/min in accordance with ASTM D638. Referring to FIG. 1, a representative stress-strain curve is shown where the tensile strain is plotted as percent strain and the stress is expressed as force or load (in lbf). Inflection points 20, 40, 50 and 60 mark points at which transformations in material behavior occur. Initially, at conditions of low strain a linear region 10 is observed. In this linear region 10 the material experiences a stress (F) directly proportional to the applied strain (u) and the material behavior can be approximated by Hooke's law (equation 2) with the constant of proportionality being the elastic or Young's modulus denoted Y:

$$F=Yu \qquad (2)$$

Also, in the linear region 10, the deformation behavior is approximately elastic, i.e. the material strain returns to zero when the applied load is removed. The stress at the point where the material's behavior changes from elastic to plastic is known as the yield stress. Application of a load beyond the yield point 20, results in permanent (or plastic) material deformation. Generally, the yield point 20 in polyethylene is evident as a maximum in the load-strain traces as shown in FIG. 1. Beyond the yield point, as the specimen is stretched continuously, the material outside the neck region in the dogbone specimen is drawn into the neck; the load does not change very much during this necking and drawing process. This necking/drawing process continues until the specimen encounters "strain-hardening" or point 50 in FIG. 1. The onset of strain-hardening simply means that any further deformation of the specimen requires considerably more energy input. This is evident in a substantial and dramatic increase in the load in FIG. 1. In other words, the onset of strain hardening 50 marks a period 90 when more stress is required to achieve a given strain than seen in the previous region of the curve. The percent strain at the onset of strain-hardening is defined as the tensile NDR. The continued application of load to the material will eventually result in the material's fracture at the break stress and strain point 60.

Some polymers do not exhibit the distinct strain-hardening behavior shown in FIG. 1. Therefore, in order to define a tensile NDR, the following criterion needs to be satisfied first: the tensile stress at break is at least 10% higher than that of the tensile yield stress ($\sigma_{brk}>1.10*\sigma_y$). The tensile NDR values reported in this application are the average of at least five measurements.

In an embodiment, the PE compositions of this disclosure have a reduced tensile NDR in comparison to conventional PE compositions. Conventional PE compositions include any PE composition used to fabricate high-pressure rated pipe such as those used in the production of PE80 or PE100 designated pipe. Examples of such conventional PE compositions include without limitation CONTINUUM DGDA 2490-BK polyethylene high density that is a bimodal PE100 rated pressure pipe resin commercially available from Dow Chemical Company or MARFLEX® HHM TR-480X high-density polyethylene that is a PE-80 rated pressure pipe resin commercially available from Chevron Phillips Chemical Company, LP.

In an embodiment, the PE compositions of this disclosure have a tensile NDR of less than about 14157ρ-, where ρ is the polymer density. In such an embodiment, the tensile NDR is expressed in percent strain and determined in accordance with ASTM D 638 and the polymer density is in units of g/cc and determined in accordance with ASTM D 1505. The PE composition of this disclosure may display a lower or equal tensile NDR at a higher polymer density than a conventional PE composition.

In another embodiment, the PE compositions of this disclosure have a tensile NDR of less than about $25\sigma_y$-130, where $\sigma_y$ is the yield stress of the composition. In such an embodiment, the tensile NDR is expressed in percent strain and determined in accordance with ASTM D 638 and the yield stress is in units of MPa and determined in accordance with ASTM D638. The PE composition of this disclosure may display a lower or equivalent tensile NDR at a higher yield stress than a conventional PE composition.

In an embodiment a PE composition of this disclosure has a tensile NDR of less than about 14157ρ-, where ρ is the polymer density, alternatively of less than about $25\sigma_y$-130, where $\sigma_y$ is the polymer yield stress, alternatively any combination thereof.

EXAMPLES

The invention having been generally described, the following examples are given as particular embodiments of the invention and to demonstrate the practice and advantages thereof. It is understood that the examples are given by way of illustration and are not intended to limit the specification of the claims in any manner.

Example 1

Alumina A, from W.R. Grace Company, was impregnated to incipient wetness with an aqueous solution of ammonium sulfate. Typically, the alumina had a surface area of about 330 m²/gram and a pore volume of about 1.3 cc/gram. The amount of ammonium sulfate used was equal to 20% of the starting alumina. The volume of water used to dissolve the ammonium sulfate was calculated from the total pore volume of the starting sample (i.e. 2.6 mLs of water for each gram of alumina to be treated). Thus, a solution of about 0.08 grams of ammonium sulfate per mL of water was employed. The resulting wet sand was dried in a vacuum oven overnight at 120° C., and then screened through a 35-mesh screen. Finally, the material was activated in a fluidizing stream of dry air at 550° C. for 3 hours, in the case of bench scale samples, or 6 hours, for the larger pilot plant samples. The samples were then stored under nitrogen.

The PE compositions of Table 1 of this disclosure were produced in a 27.3-gallon slurry loop reactor. Polymerization runs were carried out under continuous particle form process conditions in a loop reactor by contacting a metallocene catalyst in isobutane, trialkylaluminum, and a solid activator in a 0.5 L stirred autoclave with continuous output to the loop reactor.

The precontacting was carried out in the following manner. Trialkylaluminum solution and metallocene catalyst in isobutane were fed as separate streams into a tee upstream of the autoclave where they contacted each other. The solid activator was flushed with isobutane into a tee between the aforementioned tee and the autoclave, contacting the Trialkylaluminum/metallocenes mixture just before entering the autoclave. The isobutane flush used to transport the solid activator into the autoclave was set at a rate that would result in a residence time of approximately 14-16 minutes in the autoclave. The total flow from the autoclave then entered the loop reactor.

The ethylene used was a polymerization grade ethylene (obtained form Union Carbide Corporation), which was purified through a column of alumina activated at 250° C. (482° F.) in nitrogen. The 1-Hexene used was a polymerization grade 1-hexene (obtained from Chevron Chemicals Company) which was purified by nitrogen purging and storage over 13-X molecular sieve activated at 250° C. (482° F.) in nitrogen. The loop reactor was a liquid full, 15.2 cm diameter, loop reactor, having a volume of 27.3 gallons (103.3 liters). Liquid isobutane was used as the diluent. Some hydrogen was added to regulate the molecular weight of the low molecular weight component of the polymer product. The isobutane was a polymerization grade isobutane (obtained from Conoco-Phillips Company, Borger, Tex.) that was further purified by distillation and subsequently passed through a column of alumina activated at 250° C. (482° F.) in nitrogen.

Reactor conditions included a pressure around 580 psi (4 MPa), and a temperature about 95° C. (203° F.) as indicated in Table 1. Also, the reactor was operated to have a residence time of about 1.1 hours. The solid activator was added through a 0.35 ml circulating ball-check feeder and fed to the 0.5-Liter autoclave as described above. Metallocene concentrations in the reactor were within a range of about 3.27 to 3.58 parts per million (ppm) of the diluent in the polymerization reactor. Polymer was removed from the reactor at the rate of about 22 lbs per hour and recovered in a flash chamber. A Vulcan dryer was used to dry the polymer under nitrogen at about 60-80° C. (140-176° F.).

The cocatalyst (TIBA) was added in a concentration in a range of from about 110 to 201 parts per million of the diluent in the polymerization reactor. To prevent static buildup of the reactor, a small amount (less than 5 ppm, by weight, of diluent) STADIS 450 conductivity improver which is an antistatic agent commercially available from Octelstarreon LLC was usually added. The catalyst systems used were previously described and are represented by Structures A and B.

TABLE 1

| | Run No. | | | |
| --- | --- | --- | --- | --- |
| | 1 | 2 | 3 | 4 |
| Activator-Support | Sulfated Alumina | Sulfated Alumina | Sulfated Alumina | Sulfated Alumina |
| Metallocene | A + B | A + B | A + B | A + B |
| Metallocene to Reactor (ppm) | 2.51 + 1.07 | 2.25 + 1.02 | 2.37 + 1.06 | 2.51 + 1.05 |
| Autoclave Residence Time (Min) | 15.57 | 14.68 | 14.37 | 14.17 |
| Cocatalyst Type | TIBA | TIBA | TIBA | TIBA |
| Cocatalyst (precotactor + reactor) (ppm) | 20.02 + 181.48 | 19 + 168.5 | 20.02 + 174.5 | 19.69 + 89.5 |
| Rx Temp (° C.) | 95 | 95 | 95 | 95 |
| Ethylene (mol %) | 15.15 | 13.93 | 14.42 | 15.12 |
| $H_2$ (mlb/hr) | 6 | 8 | 8 | 8 |
| C2 = Feed Rate (lb/hr) | 29.61 | 29.59 | 29.53 | 29.6 |
| 1-Hexene Feed Rate (lb/hr) | 0.56 | 0.61 | 0.61 | 0.61 |
| Total iC4 Flow Rate (lb/hr) | 59.3 | 61.48 | 60.1 | 60.07 |
| Solids Conc. Wt. % | 24.63 | 24.22 | 24.23 | 24.3 |
| Polymer Production (lb/hr) | 22.48 | 22.67 | 22.33 | 22.42 |
| Density (pellets)(g/cc) | 0.954 | 0.951 | 0.952 | 0.953 |
| Mw/1000 | 346 | 279 | 278 | 286 |
| Mw/Mn | 30.5 | 35.1 | 31.4 | 33.4 |

Example 2

Figure 2:
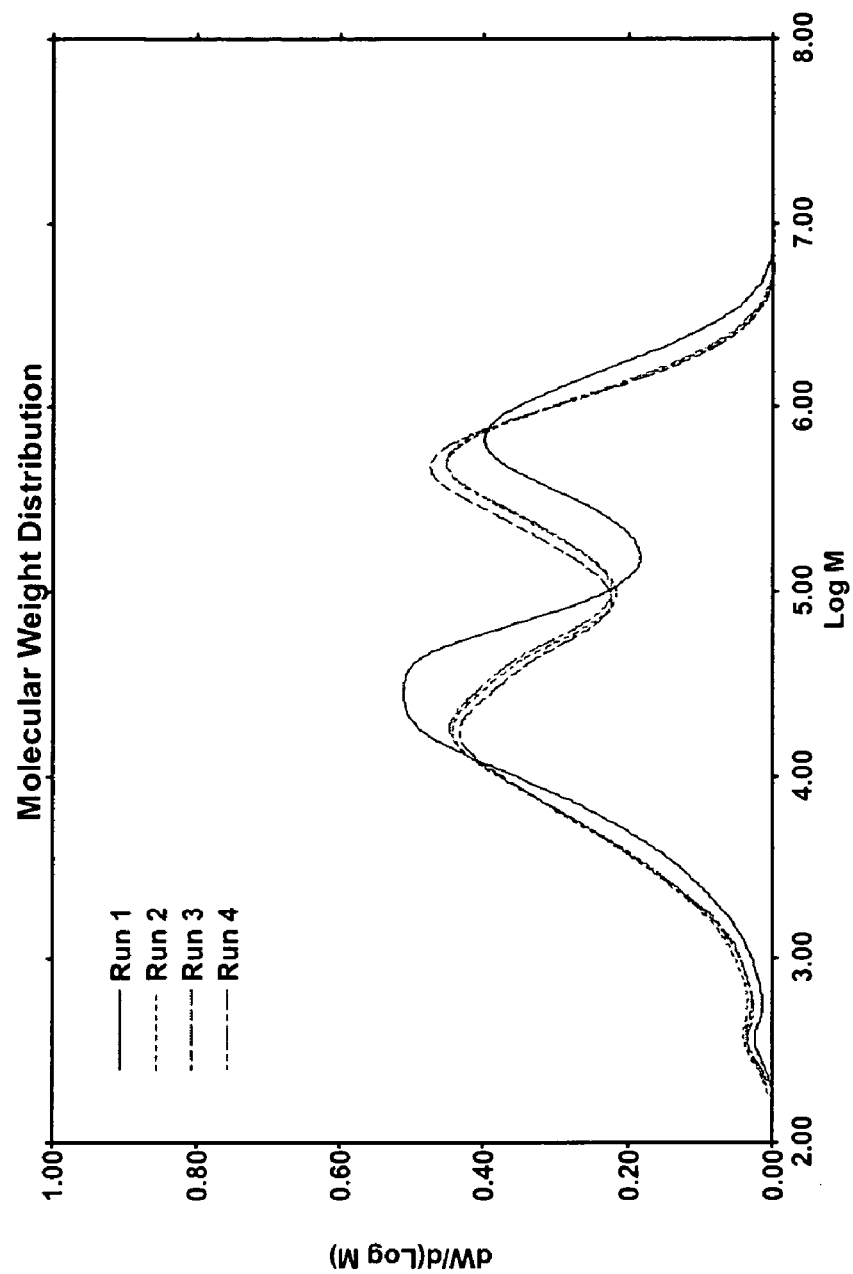
FIG. 2 is a graph of molecular weight distribution for the polymer resin samples in Example 1.

The differential weight fraction MWD was determined for the PE compositions prepared under conditions specified in Table 1 are shown in FIG. 2 respectively. The figures show the resulting PE compositions to have two peaks corresponding to a bimodal PE composition.

Example 3

Select mechanical properties of the PE compositions of this disclosure (Table 1) along with a few commercially available pressure pipe-grade HDPE resins are listed in Table 2. The tensile NDR of the PE compositions of this disclosure were determined as a function of their density, yield stress and HLMI. In all cases tensile tests of the PE compositions (compression molded by slow cooling from the molten state) were performed using die-cut ASTM Type IV specimens using an Instron tensile tester. Tests at room temperature were performed in accordance with ASTM D 638-00 using a crosshead speed of 51 mm/min.

TABLE 2

| Resin ID | Density (g/cc) | Tensile Yield Stress (MPa) | Tensile Break Stress (MPa) | Tensile NDR (Percent Strain) | Charpy Impact Energy @ 23° C. (J) | Charpy $T_{db}$ (° C.) | PENT (h) | High-Stress PENT (h) |
|---|---|---|---|---|---|---|---|---|
| TR480X | 0.943 | 22.9 | 31.0 | 569.9 | | | | |
| HiD9346 | 0.946 | 23.7 | 31.8 | 617.1 | 0.34 | −20 | ~1000 | ~450 |
| H516 | 0.950 | 25.5 | 40.0 | 549.1 | 1.90 | −35 | ~3000 | ~500 |
| DOW2490 | 0.949 | 25.8 | 37.1 | 531.0 | 1.70 | −35 | ~5000 | ~2200 |
| Inventive Run 1 | 0.954 | 27.0 | 32.3 | 512.4 | 1.28 | −35 | >7000 | >7000 |
| Inventive Run 2 | 0.951 | 26.3 | 36.3 | 483.1 | 1.33 | −35 | >7000 | >7000 |
| Inventive Run 3 | 0.952 | 26.5 | 37.7 | 493.1 | 1.20 | −35 | >7000 | >7000 |
| Inventive Run 4 | 0.953 | 27.1 | 34.1 | 507.3 | 1.08 | −30 | >7000 | >7000 |

Figure 3:
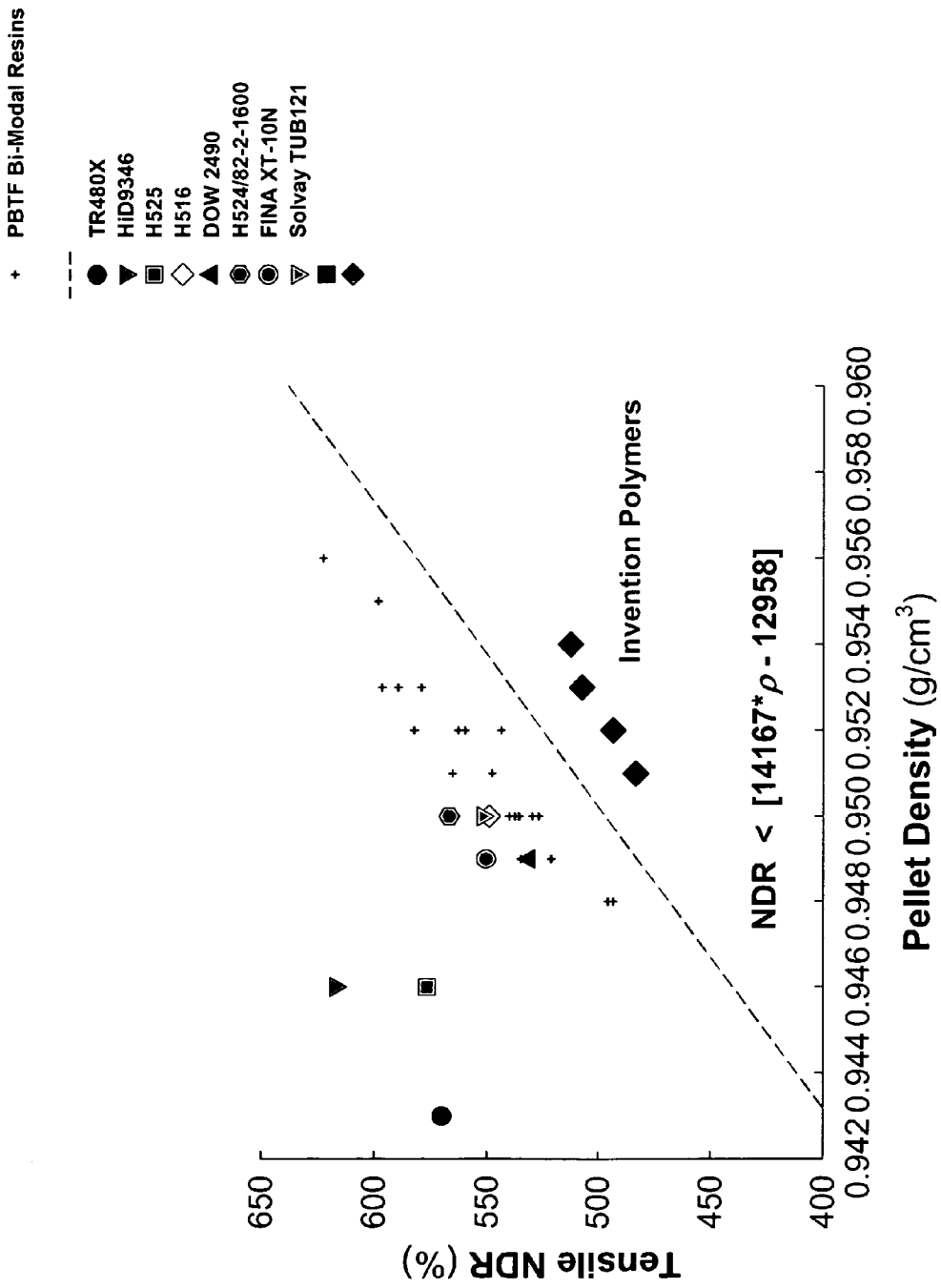
FIG. 3 is a graph of tensile natural draw ratio as a function of polymer density for the polymer resin samples in Example 3.
Figure 4:
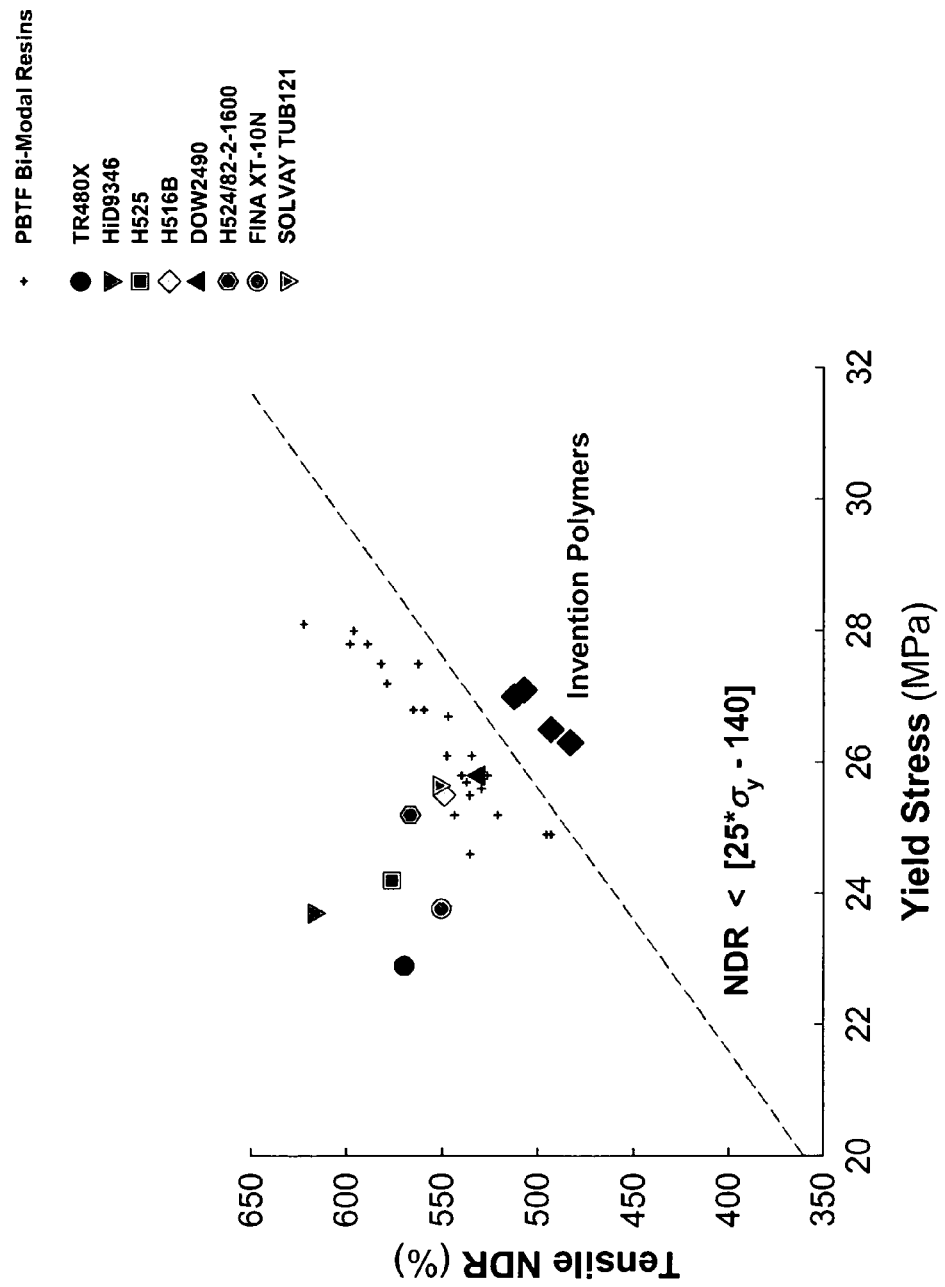
FIG. 4 is a graph of tensile natural draw ratio as a function of tensile yield stress for the polymer resin samples in Example 3.

The PE compositions of this disclosure (Table 1) are denoted as "invention polymers" in FIGS. 3 and 4. These PE compositions are compared to other resins used in the fabrication of high pressure rated polymer pipe which are: PBTF bimodal resins, a series of bimodal polyethylene developmental resins used to fabricate PE100-rated pipes which are disclosed in U.S. patent application Ser. No. 11/264,900 filed on Nov. 2, 2005, now U.S. Patent Application Publication No. US 2007-0043182 A1, and entitled "Multimodal Polyethylene Compositions and Pipe made from Same," which is incorporated herein in its entirety; MARFLEX® HHM TR-480X high-density polyethylene and MARLEX® 9346 high density polyethylene which are PE80 pressure rated pipe resins commercially available from Chevron Phillips Chemical; H524 and H525 are Chevron Phillips Chemical developmental HDPEs which are PE100 and PE80 pressure rated pipe resins respectively; MARLEX® H516B high density polyethylene compound which is a bimodal PE100 pressure rated pipe resin commercially available from Chevron Phillips Chemical; CONTINUUM DGDA 2490-BK polyethylene high density which is a bimodal PE100 rated pressure pipe resin commercially available from Dow Chemical Company; HDPE XT10N which is a high molecular weight bimodal pipe resin commercially available from TOTAL Petrochemicals Inc.; and ELTEX TUB121N3000 high-density polyethylene PE100-rated pipe which is a polyethylene resin commercially available from BP Solvay.

The tensile NDR of the resins are plotted as a function of the resin density, FIG. 3 and, as a function of the resin yield stress, FIG. 4. In FIGS. 3 and 4, the tensile NDR when plotted as a function of density and yield stress show three groupings of data. The first group comprises MARFLEX® HHM TR-480X high-density polyethylene, MARLEX® 9346 high-density polyethylene and H525 which display the least SCG resistance and consequently the highest tensile NDR in comparison to the other resins tested. This result was not surprising considering Group 1 consists of medium performance PE80 resin grades. The second group comprises PBTF bimodal resins, H524 a Chevron Phillips Chemical developmental HDPE, MARLEX® H516B high-density polyethylene compound, CONTINUUM DGDA 2490-BK polyethylene high density, HDPE XT10N and ELTEX TUB121N3000 high-density polyethylene pipe. Group 2 is a collection of PE100 resins that display excellent SCG resistance. In fact, Group 2 comprises the best performers in terms of SCG resistance amongst all commercially available pressure pipe resins. However the third group consisting of the PE compositions of this disclosure and denoted "invention polymers" display SCG resistance that show the lowest tensile NDR for the given densities and yield stress making them considerably superior with regard to SCG resistance to the high performance PE100 resins of Group 2.

Without further elaboration, it is believed that one skilled in the art can, using the description herein, utilize the present invention to its fullest extent. While preferred inventive aspects have been shown and described, modifications thereof can be made by one skilled in the art without departing from the spirit and teachings of the invention. The embodiments and examples described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The disclosures of all patents, patent applications, and publications cited herein are hereby incorporated by reference, to the extent that they provide exemplary, procedural or other details supplementary to those set forth herein.

What is claimed is:

1. A polymer composition comprising:
    a copolymer of ethylene and an alpha-olefin comonomer, wherein the alpha-olefin comonomer comprises propylene, 1-butene, 1-pentene, 1-hexene, 3-methyl-1-butene, 4-methyl-1-pentene, 1-heptene, 1-octene, 1-nonene, 1-decene, or combinations thereof;
    a density equal to or greater than about 0.947 g/cc;

a high load melt index from about 1 g/10 min to about 30 g/10 min; and a tensile natural draw ratio less than about $14157\rho$-12958, where $\rho$ is the density (g/cc) of the composition, wherein the tensile natural draw ratio is determined in accordance with ASTM D 638-00 at room temperature using a crosshead speed of 51 mm/min, and wherein the polymer composition comprises a metallocene polyethylene.

2. A polymer composition comprising:

a density equal to or greater than about 0.947 g/cc;

a high load melt index from about 1 g/10 min to about 30 g/10 min; and a tensile natural draw ratio less than about $14167\rho$-12958, where $\rho$ is the density (g/cc) of the composition, wherein the tensile natural draw ratio is determined in accordance with ASTM D 638-00 at room temperature using a crosshead speed of 51 mm/min, wherein the polymer composition comprises a metallocene polyethylene, and wherein the polymer of ethylene comprises a multimodal polymer.

3. The composition of claim 1 further comprising a PENT failure time greater than about 1000 hours.

4. The composition of claim 1 further comprising a tensile natural draw ratio less than about $25\sigma y$-130, where $\sigma y$ is the tensile yield stress of the composition.

5. The composition of claim 1 further comprising a tensile stress at break equal to or greater than 1.10 times the tensile yield stress of the composition.

6. The composition of claim 1 further comprising a rapid crack propagation S4 critical temperature equal to or less than about $-1°$ C. for an 8 inch SDR11 pipe.

7. The composition of claim 1 further comprising a Charpy ductile to brittle transition temperature equal to or less than about $-25°$ C.

8. The composition of claim 1 further comprising a razor-notched Charpy impact energy at $23°$ C. of greater than about 0.8 Joules.

9. The composition of claim 1 comprising less than about 1 weight percent of total non-polymeric additives.

10. A pipe fabricated from a polymer composition comprising:

a density equal to or greater than about 0.947 g/cc;

a high load melt index from about 1 g/10 min to about 30 g/10 min; and a tensile natural draw ratio less than about $14167\rho$-12958, where $\rho$ is the density (g/cc) of the composition, wherein the tensile natural draw ratio is determined in accordance with ASTM D 638-00 at room temperature using a crosshead speed of 51 mm/min, and wherein the polymer composition comprises a metallocene polyethylene.

11. The pipe of claim 10 further comprising a minimum required strength equal to or greater than 10.0 MPa.

12. A polymer composition comprising:

two or more molecular weight modes; and a tensile natural draw ratio less than about $14167\rho$-12958, where $\rho$ is the density (g/cc) of the composition, wherein the tensile natural draw ratio is determined in accordance with ASTM D 638-00 at room temperature using a crosshead speed of 51 mm/min, wherein less than about 1 weight percent of the composition comprises non-polymeric additives, and wherein the polymer composition comprises a metallocene polyethylene.

13. The composition of claim 12 further comprising a high load melt index from about 1 g/10 min to about 30 g/10 min.

14. The composition of claim 12 further comprising a density equal to or greater than about 0.947 g/cc.

15. The composition of claim 12 further comprising a tensile natural draw ratio less than about $25\sigma y$-130, where $\sigma y$ is the tensile yield stress of the composition.

16. A pipe fabricated from a polymer composition comprising:

a minimum required strength equal to or greater than 10.0 MPa; and a tensile natural draw ratio less than about $14167\rho$-12958, where $\rho$ is the density (g/cc) of the composition, wherein the tensile natural draw ratio is determined in accordance with ASTM D 638-00 at room temperature using a crosshead speed of 51 mm/min, wherein less than about 1 weight percent of the composition comprises non-polymeric additives, and wherein the polymer composition comprises a metallocene polyethylene.

17. A polymer composition comprising:

a tensile natural draw ratio less than about $25\sigma_y$-130, where $\sigma_y$ is the tensile yield stress of the composition;

a tensile natural draw ratio less than about $14167\rho$-12958, where $\rho$ is the density (g/cc) of the composition and wherein the tensile natural draw ratio is determined in accordance with ASTM D 638-00 at room temperature using a crosshead speed of 51 mm/min; and a tensile stress at break equal to or greater than 1.10 times the tensile yield stress of the composition, wherein the polymer composition comprises a metallocene polyethylene.

18. A polymer composition comprising:

a density equal to or greater than about 0.947 g/cc;

a high load melt index from about 1 g/10 min to about 30 g/10 min; and a tensile natural draw ratio less than about $14167\rho$-12958, where $\rho$ is the density (g/cc) of the composition, wherein the tensile natural draw ratio is determined in accordance with ASTM D 638-00 at room temperature using a crosshead speed of 51 mm/min, wherein the polymer composition comprises a metallocene polyethylene, and wherein the metallocene polyethylene is prepared from a dual metallocene catalyst system.

19. The polymer composition of claim 2 further comprising:

a PENT failure time greater than about 1000 hours;

a tensile natural draw ratio less than about $25\sigma y$-130, where $\sigma y$ is the tensile yield stress of the composition; and a tensile stress at break equal to or greater than 1.10 times the tensile yield stress of the composition.

20. The polymer composition of claim 19 further comprising:

a rapid crack propagation S4 critical temperature equal to or less than about $-1°$ C. for an 8 inch SDR11 pipe;

a Charpy ductile to brittle transition temperature equal to or less than about $-25°$ C.; and a razor-notched Charpy impact energy at $23°$ C. of greater than about 0.8 Joules.

21. The polymer composition of claim 20 further comprising an alpha-olefin comonomer comprising propylene, 1-butene, 1-pentene, 1-hexene, 3-methyl-1-butene, 4-methyl-1-pentene, 1-heptene, 1-octene, 1-nonene, 1-decene, or combinations thereof.

22. The pipe of claim 11 further comprising:
a rapid crack propagation S4 critical temperature equal to or less than about −1° C. for an 8 inch SDR11 pipe;
a Charpy ductile to brittle transition temperature equal to or less than about −25° C.; and
a razor-notched Charpy impact energy at 23° C. of greater than about 0.8 Joules.

23. The pipe of claim 22 further comprising an alpha-olefin comonomer comprising propylene, 1-butene, 1-pentene, 1-hexene, 3-methyl-1-butene, 4-methyl-1-pentene, 1-heptene, 1-octene, 1-nonene, 1-decene, or combinations thereof.

24. The pipe of claim 23 further comprising:
a PENT failure time greater than about 1000 hours;
a tensile natural draw ratio less than about $25\sigma y-130$, where $\sigma y$ is the tensile yield stress of the composition; and
a tensile stress at break equal to or greater than 1.10 times the tensile yield stress of the composition.

25. The pipe of claim 23 further comprising:
a tensile natural draw ratio less than about $25\sigma y-130$, where $\sigma y$ is the tensile yield stress of the composition; and
a tensile stress at break equal to or greater than 1.10 times the tensile yield stress of the composition.

26. The pipe of claim 25 further comprising:
a PENT failure time greater than about 1000 hours;
a rapid crack propagation S4 critical temperature equal to or less than about −1° C. for an 8 inch SDR11 pipe;
a Charpy ductile to brittle transition temperature equal to or less than about −25° C.; and
a razor-notched Charpy impact energy at 23° C. of greater than about 0.8 Joules.

27. The pipe of claim 16 further comprising:
a PENT failure time greater than about 1000 hours; and
a rapid crack propagation S4 critical temperature equal to or less than about −1° C. for an 8 inch SDR11 pipe.

28. The pipe of claim 27 further comprising:
a Charpy ductile to brittle transition temperature equal to or less than about −25° C.;
a razor-notched Charpy impact energy at 23° C. of greater than about 0.8 Joules;
a tensile natural draw ratio less than about $25\sigma y -130$, where $\sigma y$ is the tensile yield stress of the composition; and
a tensile stress at break equal to or greater than 1.10 times the tensile yield stress of the composition.

29. The pipe of claim 28 further comprising an alpha-olefin comonomer comprising propylene, 1-butene, 1-pentene, 1-hexene, 3-methyl-1-butene, 4-methyl-1-pentene, 1-heptene, 1-octene, 1-nonene, 1-decene, or combinations thereof.

30. The polymer composition of claim 17 further comprising:
a Charpy ductile to brittle transition temperature equal to or less than about −25° C.; and
a razor-notched Charpy impact energy at 23° C. of greater than about 0.8 Joules.

31. The polymer composition of claim 30 further comprising an alpha-olefin comonomer comprising propylene, 1-butene, 1-pentene, 1-hexene, 3-methyl-1-butene, 4-methyl-1-pentene, 1-heptene, 1-octene, 1-nonene, 1-decene, or combinations thereof.

32. The polymer composition of claim 31 further comprising:
a PENT failure time greater than about 1000 hours; and
a rapid crack propagation S4 critical temperature equal to or less than about −1° C. for an 8 inch SDR11 pipe.

33. The polymer composition of claim 18 further comprising an alpha-olefin comonomer comprising propylene, 1-butene, 1-pentene, 1-hexene, 3-methyl-1-butene, 4-methyl-1-pentene, 1-heptene, 1-octene, 1-nonene, 1-decene, or combinations thereof.

34. The polymer composition of claim 33 further comprising:
a PENT failure time greater than about 1000 hours;
a tensile stress at break equal to or greater than 1.10 times the tensile yield stress of the composition; and
a rapid crack propagation S4 critical temperature equal to or less than about −1° C. for an 8 inch SDR11 pipe.

35. The polymer composition of claim 34 further comprising:
a Charpy ductile to brittle transition temperature equal to or less than about −25° C.;
a razor-notched Charpy impact energy at 23° C. of greater than about 0.8 Joules; and
a tensile natural draw ratio less than about $25\sigma y -130$, where $\sigma y$ is the tensile yield stress of the composition.

* * * * *